United States Patent [19]
Ahlgren et al.

[11] 4,164,591
[45] Aug. 14, 1979

[54] METHOD OF HEATING A FOOD ARTICLE

[75] Inventors: David W. Ahlgren, Duluth; David A. Hassell, Coon Rapids; Elvis S. Zimmer, Andover, all of Minn.

[73] Assignee: Jeno F. Paulucci, Duluth, Minn.

[21] Appl. No.: 673,114

[22] Filed: Apr. 2, 1976

[51] Int. Cl.² .............................................. A21D 8/06
[52] U.S. Cl. ................................................... 426/523
[58] Field of Search ................... 426/94, 237, 523, 95, 426/243; 13/21; 99/393, 443 R, 395; 219/388, 411

[56] References Cited
U.S. PATENT DOCUMENTS

| | | | |
|---|---|---|---|
| 3,847,069 | 11/1974 | Guibert | 99/443 R |
| 3,993,788 | 11/1976 | Longenecker | 426/523 X |
| 4,004,129 | 1/1977 | Hicks | 219/388 |

Primary Examiner—Robert A. Yoncoskie
Attorney, Agent, or Firm—Henry C. Kovar

[57] ABSTRACT

A method of heating a food article of the layered type having a crust and a topping of a higher specific heat than the crust, an example of which is a pizza, has the steps of placing the food while in a refrigerated state into an oven, then broiling the topping, then baking the crust and the topping, and lastly toasting the crust; also disclosed is a rotary type oven having a broiling zone with a radiant electrical heater, a baking zone, and a toasting zone having a convective hot air electrical heater; the oven may be of the helical track type with the zones being one above another.

14 Claims, 7 Drawing Figures

METHOD OF HEATING A FOOD ARTICLE

BACKGROUND OF THE INVENTION

1. Field of the Invention

This invention pertains to a method of heating a food article of layered composition and including the steps of broiling a topping layer, baking the topping layer and a crust, and toasting the crust.

2. Prior Art

Hot food articles, such as pizzas, are frequently prepared at the place of consumption, and the article may be sized to constitute a single serving. It has been found that in attempting to bake such articles rapidly, there is a tendency for the baking to be uneven. This problem is heightened by the fact that the same equipment will typically be used for baking a pizza that begins in the frozen state as well as one that begins in the unfrozen state, and of course, the degree of freezing can vary from point to point on a particular pizza, thereby causing uneven rising, uneven baking and uneven browning, and in some instances even causing burning before the article is ready for consumption. There can be superficial overcooking with inadequate rising of dough. To resolve such problem, in the past, a separate oven has been utilized to thaw the dough before baking, and such an arrangement becomes burdensome in that the operator needs to use two ovens, needs to have multiple opening and closing of doors, and is placed at a disadvantage in needing to estimate baking time.

A concept for solution to the foregoing heating problem is provided by the oven of U.S. Pat. No. 3,847,069. This oven has a vertical axis helical track of several levels with electric heating elements in between the track levels and a rotatable reel for advancing circular food packages down the track and over the heating elements. An important feature of U.S. Pat. No. 3,847,069 is the provision of epicyclic movement of a food package to give even heating of the food.

U.S. Pat. No. 3,847,069 discloses two configurations of heating elements, in the first there is a continual length of heating element mounted underneath a relatively wide open track from the top to the bottom of the track. A second and alternative configuration is disclosed having a top section of track without a heater and a bottom section of track with a heater, the top section being referred to as a warming zone and the bottom section being referred to as a baking zone.

The oven of U.S. Pat. No. 3,847,069 will cook a food item as described therein.

However, it has been found that this oven will not interchangeably and properly heat either a frozen or a refrigerated but unfrozen food item. It has been found that this oven cannot apply extremely high intensity of heats and that the oven must use relatively low heat intensities and therefore take a relatively lengthy period of time per food item. This oven has also been found to need a lengthy track and a large oven chamber which results in high cost of manufacture and a rate of heat loss through the cabinet which makes for a very high power consumption as well as requiring a high amperage power source. This oven required a continual input of power at a level sufficient to heat a food product, regardless of whether or not there was food in the oven and the heater arrangement also made no provision for varying the power input to the heaters as the food load in the oven was increased or decreased or removed.

Further, the structure of the oven of U.S. Pat. No. 3,847,069 has been found to be too expensive for commercial usage and was found difficult to build, assemble and clean. It will be appreciated that any food oven is subject to spattering and collection of grease and cooking residue and must be cleanable and periodically cleaned in the public interest.

It is also realized that ovens of this type can no longer be inefficient users of energy and that massive applications of energy far in excess of actual workload are no longer tolerable or monetarily affordable.

OBJECTS OF THE INVENTION

Accordingly, it is an object of the present invention to provide a method of heating a food in which heat is applied at as high an intensity as is possible to different areas of the food.

Another object of the present invention is to provide a method of heating a food article having a crust and topping and evenly heating both.

It is another object of the present invention to provide an electric food oven having a helical rack and heater of minimum size.

A further object of the present invention is to provide an electric food oven having separate broiling, baking and toasting zones and a rotary food mover.

Yet a further object of the present invention is to provide an electric oven which is operable at relatively high oven temperatures and is very efficient and uses very little electricity.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

SUMMARY OF THE INVENTION

In accordance with this invention, a method of cooking a food article is provided in which a food article of the type having a crust and a topping is placed in a refrigerated state in an oven, the topping is radiantly broiled, then the topping and crust are baked and then the crust is toasted.

ON THE DRAWINGS

AS SHOWN ON THE DRAWINGS

Figure 1:
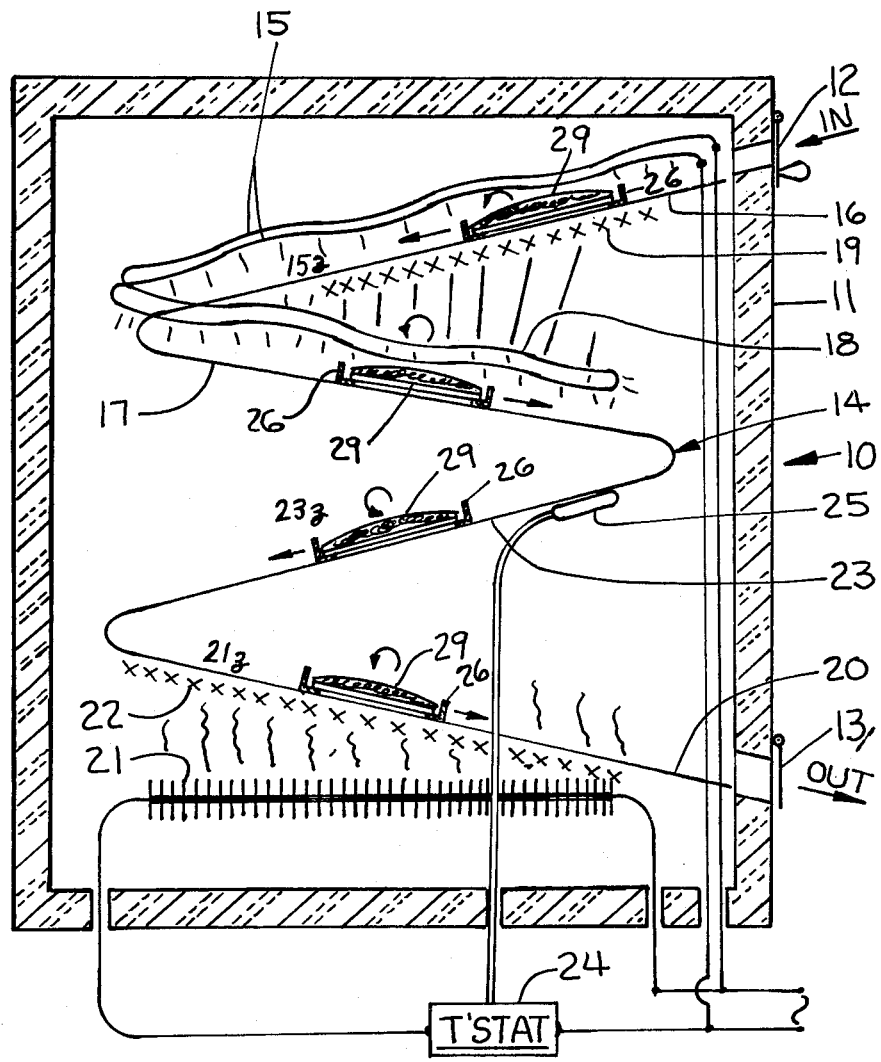
FIG. 1 is an elevational cross sectional schematic view of an electric oven for practice of the method of the present invention.

The principles of the present invention are particularly useful when embodied in a method of cooking an article of food wherein a schematic food oven, generally indicated in FIG. 1 by the numeral 10, is provided for practicing the method of the present invention.

The oven 10 has an insulated cabinet 11 with an inlet 12 and an outlet 13. Inside of the cabinet 11 there is a track 14 for supporting food articles in the oven 10. The track 14 is a conveyer type and may be round, helical, flat, sloped or some kind of a zig-zag as shown. There is a radiant electrical heater element 15 mounted atop the track 14. The track 14, as shown has a first portion 16 immediately adjacent to the inlet 12 and a second portion 17 which turns under first portion 16. The radiant heater 15 is mounted above both first and second portion 16, 17 and it will be noticed that the radiant heater 15 has an end 18 mounted above the track second portion 17 and that this heater end 18 is underneath the track first portion 16. There may be a screen 19 between the first track portion 16 and the heater end 18. The portion of the track 14 having the radiant heater element 15 atop it is called the broiling zone 15z.

The track 14 has a bottom portion 20 leading to the outlet 13. Underneath the bottom track portion 20 there is a convective heater element 21 which also may provide some radiant heat. There is a screen 22 between the convective heater 21 and bottom track portion 20. The portion of the track 14 on top of the convective heater 21 is called the toasting zone 21z.

The track 14 also has an intermediate section 23 not directly exposed to either of the heater elements 15 or 21, this portion of the track is heated by convection from the heater elements 15, 21 and is called the baking zone 23z.

The radiant heater 15 is of lesser wattage than the convective heater 21; as an example the radiant heater 15 may be of 575 watts and the convective heater 21 may be of 2000 watts. The radiant heater 15 is normally on and maintains the temperature of the air within the oven at about 600-700 degrees F. (315-375 degrees C.) and the convective heater 21 is normally off. There is a thermostat 24 which is connected to turn on the convective heater 21 and this thermostat 24 has a temperature sensor element 25 located in the baking zone. It has been found advantageous to locate this senser 25 right under the inlet 12.

Figure 2:
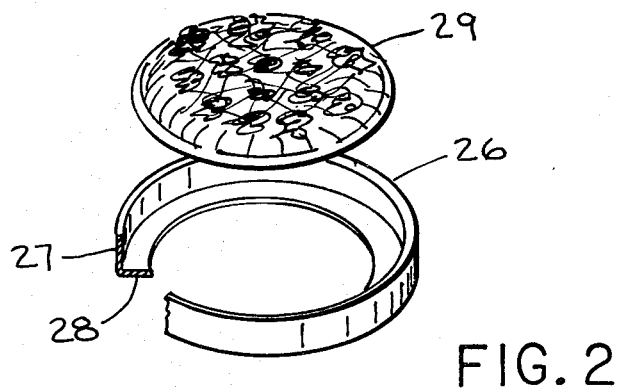
FIG. 2 is a top perspective view of a tray and an article of food for being heated by the method of the present invention.

FIG. 2 shows a tray 26 which is a pan having a cylindrical rim 27 and an annular flange 28. The tray 26 has an open bottom inside of the flange 28. A food article 29 is placed in the tray 26 and is supported by the flange 28. The tray 26 and the food article 29 are run through the oven 10 together as a package.

In the practice of the method of the present invention, the food article 29 is kept refrigerated for precluding spoilage, the food 29 is placed while in the refrigerated state, either frozen or unfrozen, into the tray 26 and then into the oven 10 through inlet 12 and onto the first portion 16 of the track 14.

The food article 29 for which the present method of cooking is extremely advantageous, is a particular configuration. It is a layered food having at least two layers. Specific examples of this type of food are pizzas, tostadoes, pot pies, fruit pies and sandwiches. Regardless of generic name, the food is characterized by a crust of some type and has a topping on the crust of a higher specific heat than the specific heat of the crust. The crust may be bread, either soft or hard and may be of such things as wheat, corn, potato, rice and the like. The topping, which term includes a filling if the crust is cupped in the shape of a pie crust, typically will be one of tomato, cheese, meat or fish, fruit, vegetables, egg and the like. All of these toppings have a high moisture content and require much more heat for thawing and/or cooking than does the crust. It has been found that because of the higher specific heat of the topping, a relatively intense heat can be directed at the topping, this heat being of an intensity that would burn the crust were it applied to the crust. It has also been found advantageous to slowly heat the crust so that the bottom remains relatively porous and to lastly brown the crust just before discharging the food from the oven. If the crust is browned first or early in the cooking cycle, it retains the moisture seeping into the crust from the topping and becomes soggy. It has been the past practice to slowly heat foods of this type in a convection oven and an oven of this type can be seen in any pizza shop and every individual who has ordered a pizza is well aware that the cooking time is in the range of 15 minutes to one half hour. This time is also required for pies and the like which are usually cooked in a person's home. The faster alternative has been a microwave oven but the food cooked by a microwave oven is usually not browned and these ovens are extremely expensive and handle only a single or a few items of food at one time and do not allow opening of the oven chamber while in operation. The food article 29 is placed in the oven 10 with the crust facing down and the topping facing up so that as the topping is melted, or made relatively fluid, it does not run or drop off the crust. The oven 10 is preheated to just about the desired cooking temperature. If the food article 29 is a pizza for example, the oven 10 preheat temperature will be at about 600 degrees F. (315 degrees C.). The oven 10 is held at the preheat temperature by the broiling zone radiant heater 15 which is normally on. If the power supply voltage is low, the convective heater 21 may occasionally cycle on and off to maintain such a high temperature. The radiant heater 15 is sized to have a normal power output, with normal voltage, sufficient to maintain the oven 10 at the desired temperature without assistance from the convection heater 21. When the food article 29 is placed upon the track 14, it is immediately exposed to the hot air in the oven 10 and also to relatively high intensity radiant heat directed down upon the topping from the radiant heater 15. The food article 29 is moved along the length of track 14 and is advanced through the broiling zone 15z under the radiant heater 15. As the food article 29 is being advanced through the broiling zone 15z, the crust is also exposed to some radiant heat from the heater 15 because the end 18 of the radiant heater 15 is under the first portion 16 of the track 14. The screen 19 serves to partially shield the crust from the radiant heat and prevents burning or premature browning of the crust. As the food article 29 is advanced through the broiling zone 15z, it goes past the part of the track 14 with the radiant heater 15 underneath and the application of radiant heat to the crust is terminated while the application of radiant heat to the topping continues. It has been found that a maximum amount of radiant heat can be applied to the food article 29 if the time period for direct radiant heating of the topping is twice or more the time period of direct radiant heating of the bottom of the crust while in the broiling zone 15z.

When the food article 29 is first placed in the oven, the food is cold and immediately begins to cool the air inside the oven. The cooled air will draft down upon the thermostat sensor 25 and the convection heater 21 will be turned on. The convection heater 21 replaces the heat loss into the food article 29 and maintains the air within the oven 10 at the preheated temperature within tolerable variations. The convection heater 21 has about three times the power of radiant heater 15 and creates a tremendous input of heat into the oven 10. Sensing of the air temperature in the baking zone 23z has been found extremely advantageous for quick turn-on and turn-off of the convection heater 21.

When the food article 29 reaches the end of the broiling zone 15z, the topping will have been thawed if it was frozen and it will also have been browned by the radiant heat. The crust will have been thawed if it was frozen and will also be warm. The food article 29 will be advanced along the track 14 and transferred into the baking zone 23z along the track intermediate portion 23 which is convectively heated by both heaters 15 and 21. The food article 29 is advanced through the baking zone 23z and in this zone is exposed to hot air which gradually increases the temperature of both topping and crust and serves to bake and even the temperature of the food article 29. When the food article 29 approaches the part of track 14 on top of the convection heater 21, the food article 29 is transferred into the toasting zone 21z. As the food article 29 is being advanced through the toasting zone 21z, the extremely hot air coming upward from the convection heater 21 contacts the bottom of the crust of the food article 29. The convection heater 21, because of its high power output, also gives off some radiant heat and the screen 22 serves to protect the crust from being charred by the incidental radiant heat. It has been found that when the combined time of exposure to the partially shielded incidental radiant heat from convection heater 21 and the radiant heat from broiler heater 15 against the bottom of the crust is approximately equal to the time of direct radiant heating of the topping, that both topping and crust are well and evenly browned. This result is produced by applying a lesser amount of radiant heat, from a fixed output heater 15, against the crust than against the topping. It has also been found preferable that the food article 29 be in the broiling zone 15z a period of time greater than the time in either the baking or toasting zones in order to properly heat the topping. The topping, depending upon its composition relative to the crust, should be broiled by radiant heat from twenty-five to fifty percent of the time the food article 29 is in the oven 10.

The food article 29 is evenly and continually advanced along the track 14 from the inlet 12 toward the outlet 13 and as the food article 29 is advanced, it is continually revolved about itself as it sits on the track 14. It has been found beneficial to revolve the food article 29 about itself at least one time in each of the broiling, baking and toasting zones, for even heating of the food.

When the food article 29 reaches the end of the track 14, it is automatically discharged from the toasting zone 21z and from the oven 10, possibly to a food warmer (not shown) or else to be immediately consumed.

The foregoing method has been found to allow and make possible the application of very intense heats and has shortened the time required to cook food article 29. The method has been found useful for simultaneously cooking successive food article 29 placed one behind the other in the oven 10. The broiling radiant heater 15 gives off a predetermined radiant heat regardless of air temperature in the oven 10 and the convection heater 21 with its greater power can maintain the air and baking temperature in the oven 10 as well as toast each food article 29. Further, a plurality of food articles 29 can be heated at one time, one after another with this method having transferring of the food from zone to zone.

Referring now to FIGS. 3-7, there is shown a preferred structural embodiment of an oven for practicing the described method of cooking an article 29 of food.

Figure 3:
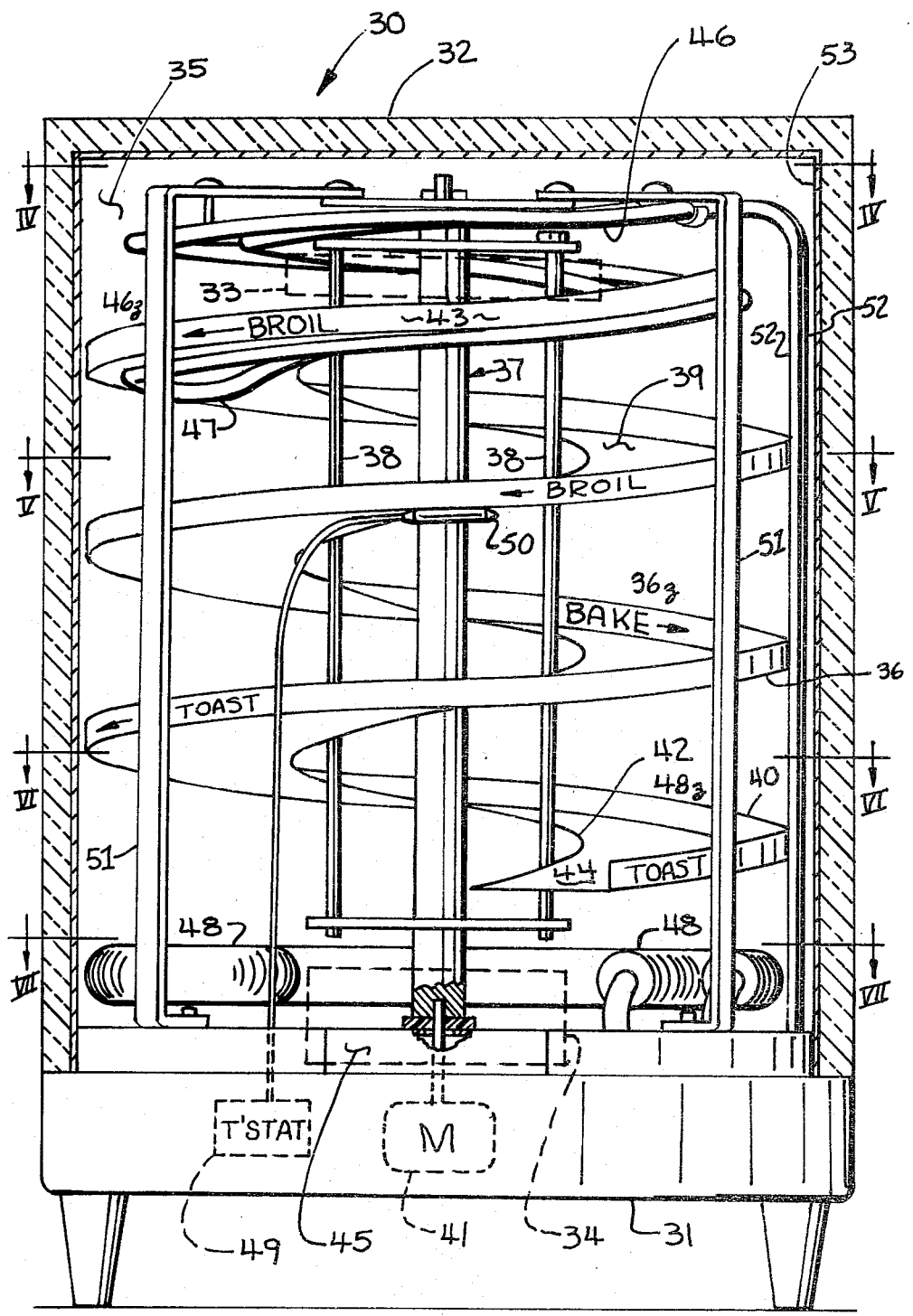
FIG. 3 is a front elevational sectional view of a preferred structural embodiment of an oven for practice of the present invention.

In FIG. 3 there is shown an oven, generally indicated by the numeral 30, having an insulated base 31, an insulated cover 32 having an inlet 33 and an outlet 34 to an oven chamber 35 formed within the base 31 and cover 32. Within the oven chamber 35 there is a vertical axis annular trackway 36, which may be a multilevel helix as shown, and a co-axial drive reel 37 having drive members 38 for advancing a food article 29 around the trackway 36. The trackway 36 has an annular support surface 39 and a rim 40 for holding a food article 29, such as that shown in FIG. 2 and previously described with respect thereto, on the support surface 39 with a portion of the food article 29 overhanging to the inside of the support surface 39. The drive reel 37 is rotatable about the axis of the trackway 36 by a motor 41. During rotation of the drive reel 37, the drive members 38 revolve through a circular path adjacent to the inner circular edge 42 of the support surface 39 and engage the overhanging portion of any food article 29 and advance the food article 29 around the trackway 36.

A food article 29 is placed in the inlet 33 and upon a loading end 43 of the trackway 36 and the drive members 38 engage and advance the food item around and down the trackway 36 to an unloading end 44 where the food article 29 falls off the trackway 36 and slides down a discharge ramp 45 and out of the oven chamber 35 through the outlet 34.

The trackway 36 may have a flat support surface 39 in the shape of an annulus or a portion of an annulus or it may be helical as shown and may be of a single or a multiple level. Further, the drive members 38 may revolve either inside of the trackway 36 as shown, or outside of, on top of, or through the support surface 39. The important thing is that there is a conveyor which moves the food article 29 through a path inside the oven chamber and through heating zones as will be explained.

An important feature of the oven 30 is that it has separate broiling, baking and toasting zones with the broiling and toasting zones having their own heating elements. On the top of the trackway 36 there is mounted a radiant heater element 46 which is on top of the support surface 39 and extends over a first portion of the support surface 39. The portion of the support surface 39 having the radiant heater 46 thereover is the broiling zone 46z of the trackway 36. The radiant heater 46 extends directly over and atop the trackway loading end 43 and from there extends about one and onehalf turns above the support surface 39 and about one-half turn below the support surface 39. The radiant heater 46 has a looped end 47 where it is turned around to form a return back up the trackway 36 and the inlet 33 is at a level between the loading end 43 and the radiant heater 46. In the bottom of the oven chamber 35 there is a convective heater 48 which also gives off a limited amount of radiant heat. Directly atop the convective heater 48 is the last portion of the length of the trackway support surface 39. This length of the trackway 36 is the toasting zone 48z. Between the broiling zone 46z and the toasting zone 48z there is an intermediate portion of the length of the trackway support surface 39 providing a baking zone 36z that does not have a heating element but is heated by convection from both of the heaters 46 and 48. When the trackway 36 is of a helical configuration as shown, the baking zone 36z is on top of the toasting zone 48z and the broiling zone 46z is on top of the baking zone 36z and it has been found advantageous that each zone have at least one revolution or level of support surface 39.

The radiant heater 46 is connected directly to line power and is normally on. The radiant heater 46 is of sufficient power, with normal line voltage, to maintain the oven chamber 35 at a predetermined temperature, an example of which is 600 degrees F. (315 degrees C.). The convective heater 48 is of a much greater power than the radiant heater 46. In oven 30 it has been found that a 575 watt radiant heater 46 and a 2000 watt convective heater 48 work well, and in any event, the bottom convective heater 48 should have at least twice the wattage of the top radiant heater 46. The convective heater 48 is normally off and is controlled by a thermostat 49 having a sensor 50 mounted in the baking zone 36z and directly below the inlet 33 and directly above the outlet 34 with the inlet 33 and outlet 34 being one above the other. When the thermostat 49 senses either a predetermined drop in temperature or a predetermined low temperature, it turns on the convective heater 48 until the oven chamber 35 is heated to a shut off temperature. As an example, the thermostat may turn on at 575 degrees F. (300 degrees C.) and turn off at 675 degrees F. (375 degrees C.).

The trackway 36 is preferably formed of perforated sheet metal with the support surface 39 having perforations 39p with an area in the range of forty to sixty percent of the area of the support surface 39. The perforated sheet metal support surface 39 is clearly shown in FIG. 4 which also shows a top view of the radiant heater 46 mounted atop the support surface 39 and loading end 43.

Figure 5:
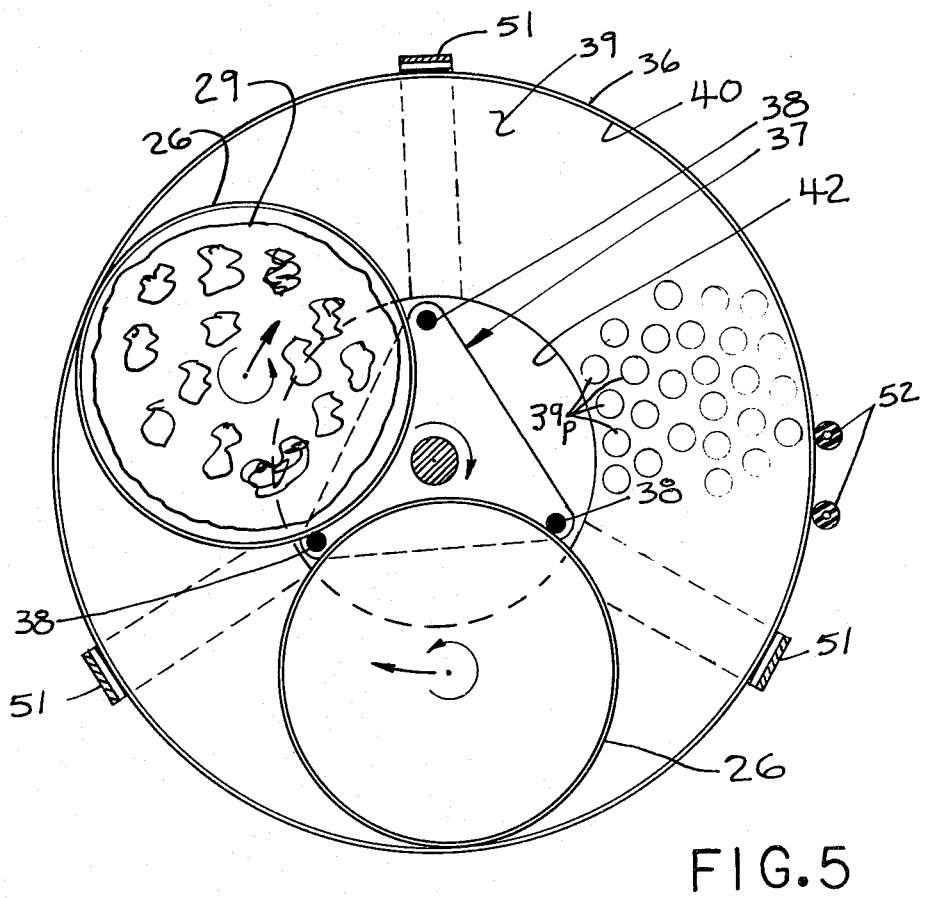
FIG. 5 is top sectional view taken along lines V—V of FIG. 3.

FIG. 5 shows the rotation of the drive reel 37 with the drive members 38 engaging a food article tray 26, and the rim 40 retaining the food article 29 on support surface 39 while the drive members 38 advance the food article 29 around the trackway 36. In the illustrated configuration the food article 29 rides against the rim 40 and is turned about its own axis as it is advanced along the trackway 36.

Figure 6:
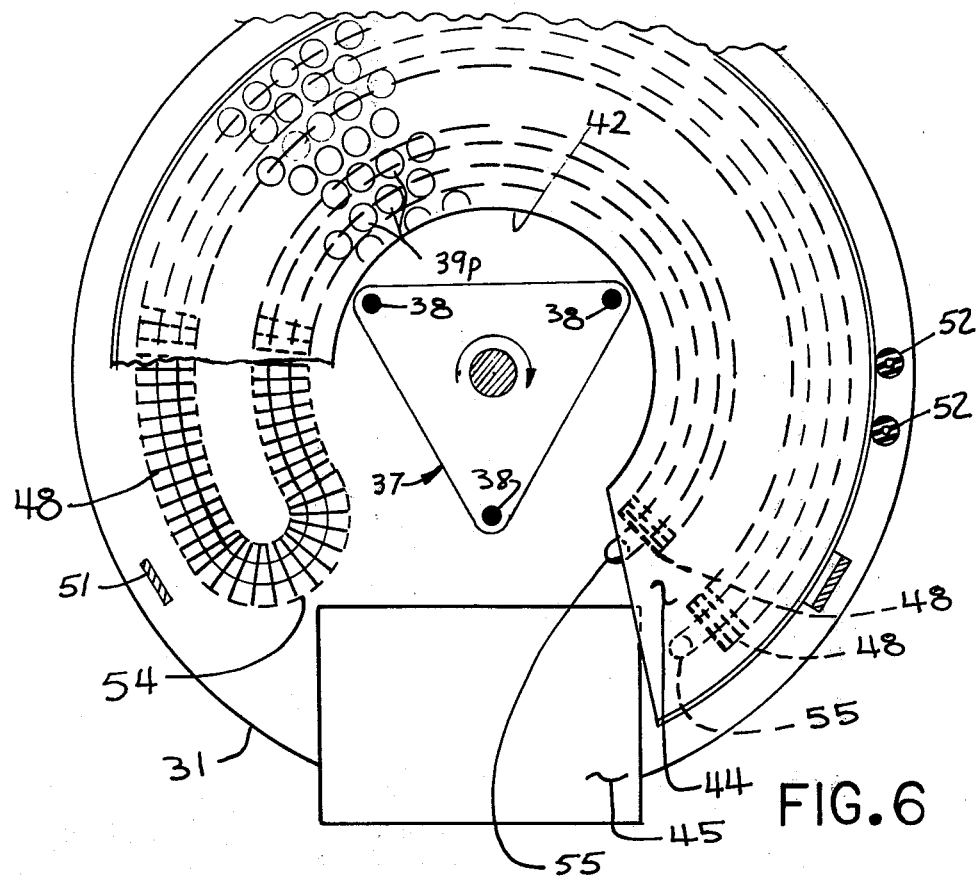
FIG. 6 is a top sectional view taken along lines VI—VI of FIG. 3.
Figure 7:
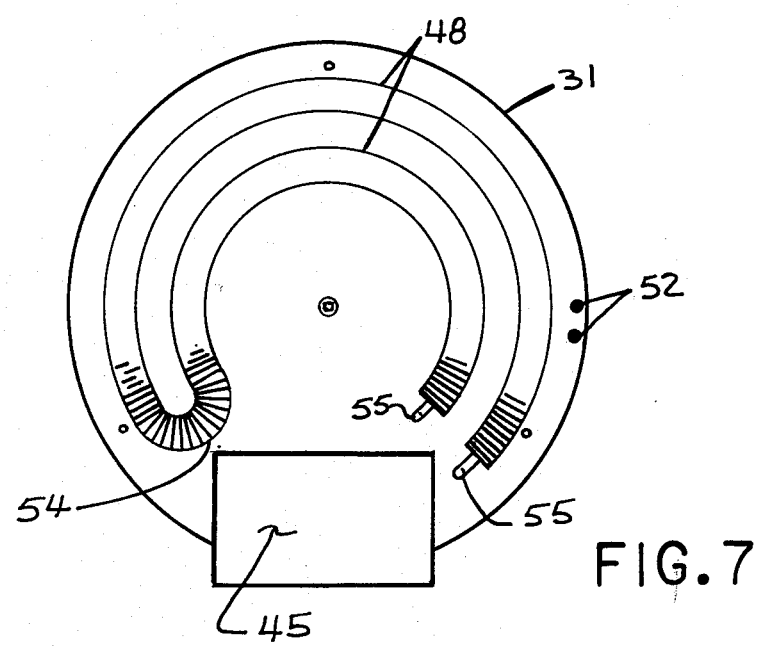
FIG. 7 is a top sectional view taken along lines VII—VII of FIG. 3.

FIGS. 6 and 7 illustrate the structure of the convective heater 48 which is mounted on the base 31. The convective heater 48 is shaped in the form of a circular C-shape coil having an arcuate length of less than 360 degrees and a pair of ends 54, 55 which form a space for and opening to the discharge ramp 45 and outlet 34, the ramp 45 and outlet 34 are both below the coil of the convective heater 48 so that hot air from the heater will not rise out of the outlet 34.

Figure 4:
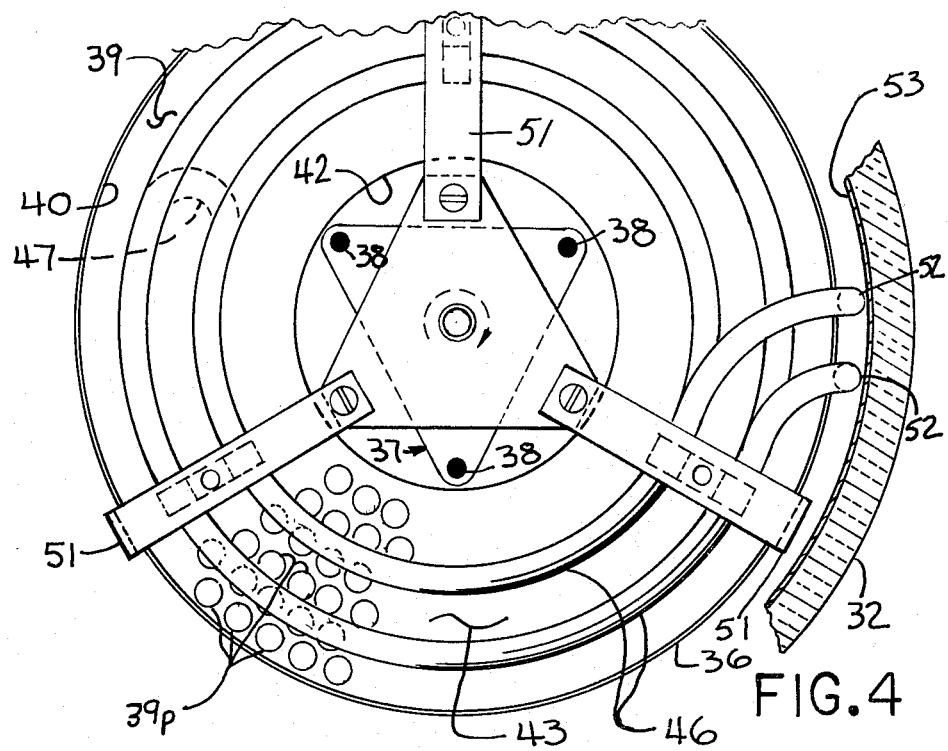
FIG. 4 is top view taken along lines IV—IV of FIG. 3.

Another important feature of the oven 30 is a construction of a helical trackway of minimum size and a cabinet of minimum size. Referring to FIGS. 3 and 4 the helical trackway 36 has support members 51 mounted to the outside of the trackway 36. At least two support members 51 are required and three are preferred. The support members 51 are mounted with their bottom ends to the bottom base 31 of the oven chamber 35 and support the trackway 36 above the bottom base 31. The electrical radiant heater element 46 mounted on top of the trackway 36 has connector portions 52 extending down and adjacent to the outside of the trackway 36 to the bottom base 31 where the connector portions 52 are electrically connected to a power source. The oven cover 32 has an inner cylindrical wall 53 mounted and positioned as close as possible to the support members 51 and heater connectors 52 as is possible. With this configuration it is believed the diameter and surface area of the wall 53 are minimized and that therefore the heat transfer area is minimized. The heater connector portions 52 are positioned radially between the support members 51 and have a non-heating conductor from top to bottom so that there is no concentrated hot spot in the oven inner wall 53. This configuration of trackway and heater has been found to significantly reduce energy consumption of the oven 30.

In operation and use of the oven 30, the oven chamber 35 is preheated and held at an operating temperature by the top radiant heater element 46 and the drive reel 37 is rotating. A food article 29 in a tray 26 is loaded into the oven chamber 35 through the inlet 33 and placed upon the trackway loading end 43. The food article 29 is immediately being broiled by the radiant heater 46 and one of the drive means 38 will engage the food article 29 via the tray 26 and advance it around the trackway 36 between the coils of the radiant heater 46 and through the broiling zone 46z. When the food article 29 is first placed in the oven chamber 35, the surrounding air will be immediately cooled and will draft down over the thermostat sensor 50 which is mounted only one level below the loading end 43, and the thermostat will turn on the convective toasting heater 48. As the food article 29 is advanced around the trackway 36 on the support surface 39, the food article 29 will go past the radiant heater end 47 and radiant heating of the bottom of the food article 29 will be terminated while the top of the food article 29 will be radiantly broiled for another revolution of travel on the trackway 36. During the time the food article 29 is on top of the radiant heater 46, part of the radiant heat will pass through the perforated track and against the bottom of the food article 29. It should be explained that the radiant heater 46 will heat through the support surface 39 below the heater 46 as the support surface 39 is about one-half perforated, the next down level of support surface 39 will receive radiant heat of about one-eighth the intensity of the heat applied to the support surface 39 directly below the heater 46.

When the food article 29 is advanced below and beyond the end 47 of radiant heater 46, it is transferred into the intermediate section of the trackway 36 which forms the baking zone 36z. The baking zone 36z is not directly heated by either of heaters 46 or 48 but is indirectly heated by both as hot air convectively moves around the inside of the oven chamber 35. When the food article 29 is advanced almost to a position directly above and one level above the unloading end 44, the food article 29 is then being transferred into the toasting zone 48z where the support surface 39 is directly above and is directly exposed to the massive heat being given off by the convection heater 48. When the convection heater 48 is on, the air temperature in the bottom of the oven chamber 35 will exceed the upper oven chamber air temperature by at least two hundred degrees F. and the hot air coming off the heater 48 will pass upwardly around the trackway 36 and also through the perforations of support surface 39 to heat the baking zone 36z. As the food article 29 is further advanced, it will go through the toasting zone 48z, be toasted and as it is pushed off the loading end 44, it will fall on to the discharge ramp 45 and go out through the outlet 34.

After the food article 29 has been discharged, the top heater 46 remains on but the lower heater 48 is turned off by the thermostat 49. It should also be noted that the sensor 50 is shielded from each of the heaters 46 and 48 by a layer of the support surface 39. As shown in FIG. 5, several food articles 29 can be loaded into the oven 10, one item 29 after another.

It has been found that this oven 30 works well with either frozen or unfrozen foods. For example, an unfrozen pizza can be cooked and browned in two minutes and a frozen pizza can be thawed, cooked and browned in three minutes, the longer time is obtained by slowing down the drive reel 37. In addition to the layered foods, and the open bottom tray 26 which were previously described, the method and the preferred oven 30 are very useful for other foods. As an example, the method and oven 30 give excellent results with fish, meat and poultry patties, potatoes, eggs, and omelets. Foods of these types are being run through the oven 30 in closed bottom pans.

The oven 30 has been found extremely economical, as an example, an oven with a 575 watt top heater and a 2000 watt bottom heater will idle and hold at a preheated 575/600 degrees F. on about 4KWH over an eight hour day. This is extremely efficient for an oven 30 of this type. The oven 30 also has power and when the large bottom heater 48 is turned on, the oven 30 can continually handle food items, just like a conveyor line oven in a factory.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A method of cooking a food article having a layer of crust and a layer of topping upon the crust, the topping having a higher specific heat than the crust, comprising the steps of:
   (a) placing the food article while in a refrigerated state into a heated oven with the crust facing downwardly;
   (b) broiling the topping by advancing the food article through a broiling zone underneath a source of radiant heat applying radiant heat directly against the topping;
   (c) transferring the food article from the broiling zone to a baking zone;
   (d) baking the food article by advancing the food article through the baking zone while applying convective hot air heat to the food article and bringing the temperature of both topping and crust layers to an even and heated temperature;
   (e) transferring the food article from a baking zone to a toasting zone;
   (f) toasting the bottom of the crust by advancing the food article through the toasting zone over the top of a source of both convective and radiant heat applying convective hot air and radiant heat to the bottom of the crust for browning the crust in the toasting zone; and then
   (g) automatically discharging the heated food article in a cooked and ready for consumption state, from the toasting zone and from the oven.

2. A method according to claim 1, including the step of continually revolving the food article about its own center while advancing the food article through the broiling and toasting zones, for even heating of the topping and the crust.

3. A method according to claim 1, in which the food article is placed in the oven while in a frozen state and including the further step of thawing the crust by simultaneously applying radiant heat upwardly against the crust while applying the radiant heat downwardly against the topping.

4. A method according to claim 3, including the step of terminating the application of radiant heat to the crust while continuing the application of radiant heat to the topping, for preventing premature browning of the crust.

5. A method according to claim 3, including the step of partially shielding the crust from the upwardly directed radiant heat, for preventing burning of the crust.

6. A method according to claim 1, in which the food article is placed in the oven while in a frozen state, and including the further step of thawing the initially frozen topping with the radiant heat applied thereto in the broiling zone and then commencing the step of broiling, application of radiant heat against the topping being continuous through the steps of thawing and broiling.

7. A method according to claim 1, in which the step of broiling includes the step of browning the topping with the radiant heat in the broiling zone.

8. A method according to claim 1, including the step of partially shielding the crust from the toasting heat while advancing the food through the toasting zone, for preventing burning of the crust.

9. A method according to claim 1, including the further steps of:
   (a) continually heating the air within the oven with the source of radiant heat in the broiling zone;
   (b) sensing the temperature of the heated air within the baking zone,
   (c) turning on a normally off source of convective hot air and radiant heat below the toasting zone in response to sensing a predetermined drop in the temperature of the air within the baking zone, and
   (d) replacing the heat absorbed by the food item during cooking thereof, with the heat given from the normally off heat source.

10. A method according to claim 1, in which the topping is broiled as it is radiantly heated in the broiling zone for a period of time greater than the period of time during which the food article is toasted in the toasting zone.

11. A method according to claim 3, in which the combined time period of the radiant heating of the crust in both the broiling and toasting zones is approximately equal to the time period during which the topping is broiled by being radiantly heated in the broiling zone.

12. A method according to claim 1, in which the topping is radiantly broiled for a period of time in the range of twenty-five to fifty percent of the time period that the food article is in the oven.

13. A method according to claim 1, in which the topping is radiantly broiled for a period of time which is greater than the period of time the food article is either baked or toasted.

14. A method according to claim 1 including the step of completely revolving the food article about its own axis at least one revolution during each of the steps of broiling, baking and toasting respectively, for even heating of the food article.

* * * * *